April 16, 1957
J. B. CAIN
2,788,934
HANDLED BASKET
Filed Feb. 2, 1955
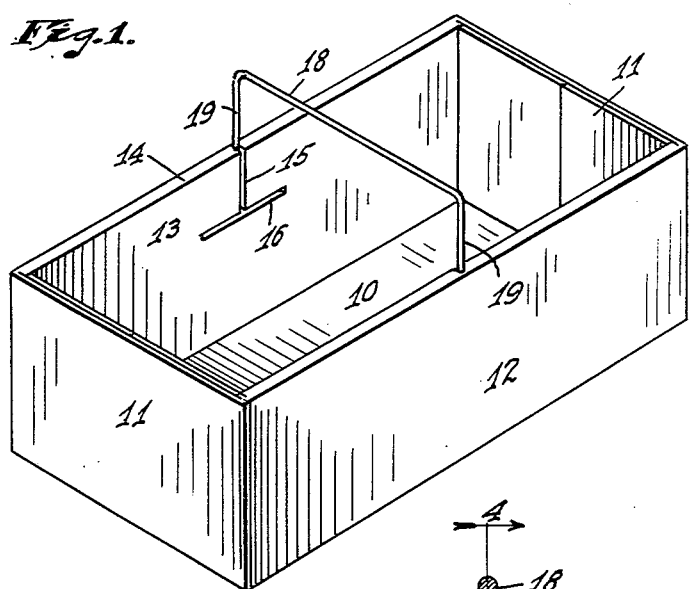
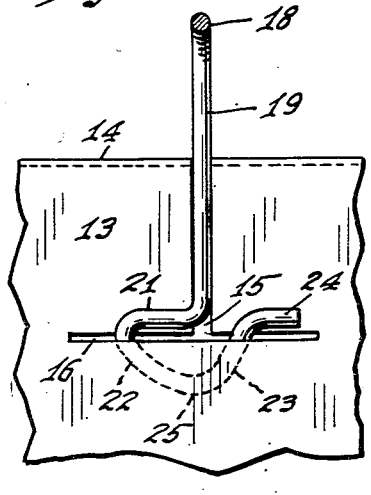
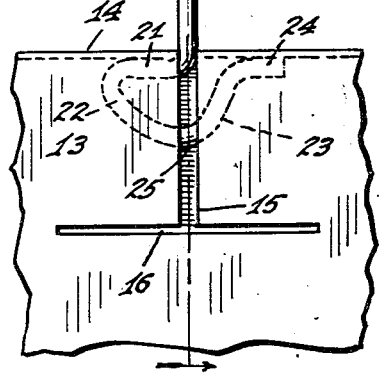
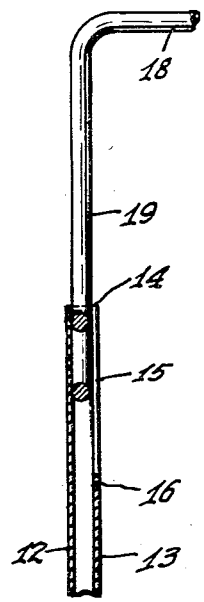
INVENTOR.
JOSEPH B. CAIN,
BY
ATTORNEYS.

United States Patent Office 2,788,934
Patented Apr. 16, 1957

2,788,934

HANDLED BASKET

Joseph B. Cain, Crawfordsville, Ind., assignor to Mid-States Steel and Wire Company, Crawfordsville, Ind., a corporation of Indiana Application February 2, 1955, Serial No. 485,729

1 Claim. (Cl. 229—52)

This invention relates to the provision of a wire handle on a basket formed of foldable material and possessing side walls of double thickness united by folds defining the upper edges of the side walls. It has heretofore been proposed to provide such a basket with a bale-like handle including vertical side portions which extend through openings in the aforesaid folds into the spaces between the inner and outer thicknesses of the side walls and which are provided near their lower ends with offset portions adapted to engage the under surface of the fold to provide for the transmission of load from the basket to the handle. A basket embodying my invention is of this general type but my handle differs from prior handles in the specific form of the offset portions and my basket differs from prior baskets in the arrangements provided for application of the handle.

According to my invention, the inner thickness of each side wall is provided in its upper portion with an inverted T-shaped slot. The upper end of the vertical leg of such slot preferably communicates with an opening in the fold which unites the inner and outer thicknesses of the side wall. The lower end of each side of the bale-like handle is bent to provide aligned portions adapted to engage the lower surface of the fold on opposite sides of the opening therein and a curved central portion or nose shaped to facilitate its entry into the horizontal leg of the T-shaped slot. The handle is applied to the basket by lowering it within the basket until the bent portions at the lower ends of the handle-sides have passed through the horizontal stretches of the T-shaped slots into the spaces between the inner and outer thicknesses of the side walls. Thereafter, when the handle is raised relatively to the basket, the bent portions of the handle remain in such spaces and come into engagement with the lower surface of the side-wall folds.

The accompanying drawing illustrates the invention:

Fig. 1 is an isometric view of a basket with a handle applied thereto;

Fig. 2 is a fragmental view illustrating the inner thickness of a side wall of the basket in elevation and showing the handle at an intermediate stage in the process of its application to the basket;

Fig. 3 is a view similar to Fig. 2 showing the final stage of application of the handle to the basket; and Fig. 4 is a section on the line 4—4 of Fig. 3.

The basket illustrated is formed of corrugated board or other foldable sheet stock to provide a bottom 10, end walls 11, and side walls 12. The side walls 12 are integral at their upper edges with flaps 13 which are folded inwardly to lie in parallel spaced relation to the side walls. By virtue of this arrangement, each side wall possesses inner and outer thicknesses united by a bend 14 which defines the upper edge of the side wall. Each flap 13 or inner side-wall thickness is provided with an inverted T-shaped slot having a vertically extending portion 15 and a horizontally extending portion 16. The vertically extending slot-portion 15, at its upper end, preferably extends into the fold 14.

The handle shown in the drawing is of a general inverted U-shape, conveniently formed from a single length of metal wire bent to provide a horizontally extending grip 18 and downwardly projecting sides 19. At its lower end, each of the handle-sides 19 is bent in a plane perpendicular to the plane of the handle-body 18—19 to provide a horizontal portion 21 continuous with but extending perpendicularly to the handle-side 19, a first inclined portion 22 which extends downwardly and inwardly from the outer end of the horizontal portion 21, and a second inclined portion 23 which extends upwardly and outwardly from the lower end of the portion 22 to a point in line with the portion 21, where the extreme wire-end 24 is bent to lie in substantial coaxial relationship with the portion 21. The two inclined portions 22 and 23 are united by a downwardly convex bend 25 which desirably has its lowermost point located in substantial alignment with the associated handle side 19. The overall extent of the two aligned portions 21 and 24 is desirably somewhat less than the length of the horizontal slot-stretch 16.

In applying the handle described to the basket, the handle is lowered in substantially vertical position with its sides 19 inside the basket. Desirably, the distance between the lower ends of the handle-sides 19 is slightly greater than the distance between the inner faces of the side-wall thicknesses 13, so that as the handle is lowered into the basket the lower ends of the handle-sides 19 will bear resiliently against the flaps 13 and deflect outwardly the two triangular portions thereof defined by each of the T-shaped slots 15—16. When the bends 25 attain the level of the horizontal slot-stretches 16, the handle is easily manipulated to cause such bends to enter the horizontal slot-stretches in the manner indicated in Fig. 2. Upon continued lowering of the handle, the entire lower portion of each handle-side 19 passes through the horizontal slot-stretch 16 into the space between the two thicknesses 12 and 13 of the side wall, and the triangular flap-portions above referred to spring back into the plane of the inner side-wall thickness 13, so that when the handle is raised relatively to the basket the lower ends of the handle sides will remain in the space between the inner and outer side-wall thicknesses. When the handle is fully raised, the portions 21 and 24 engage the lower surface of the fold 14, as indicated in Figs. 3 and 4, to provide for the transmission of load from the basket to the handle.

The desirable location of each bend 25 in substantial alignment with its associated handle-side 19 facilitates insertion of the bend into the slot-stretch 16 even if such slot-stretch is hidden by the contents of the basket. After the handle has been inserted, it can be lowered to bring its intermediate portion 18 into coplanar relationship with the upper edges of the side and end walls of the basket, thus making it possible to stack the baskets. At any time after being so loaded, the handle can be raised to the limit provided by engagement of the portions 21 and 24 of the fold 14.

I claim as my invention:

A basket formed of foldable sheet stock and having opposite side walls of double thickness, the two thicknesses of each side wall being united at their upper edges by a bend, the inner thickness of each side wall being provided with vertical and horizontal slot-portions, said vertical slot portion extending downwardly from the upper edge of the side wall to a point intermediate the height thereof, said horizontal portion joining said vertical portion at the lower end thereof and extending in both directions therefrom, and a carrying handle detachably secured to said basket, such handle comprising a length of circular wire bent into an inverted U-shape to provide a central grip portion and sides projecting downwardly therefrom, each of said handle-sides being bent at its lower end to provide a retainer disposed in a plane perpendicular to said grip portion and comprising a first stretch projecting horizontally from the handle-side, a second stretch extending obliquely downward beneath the first stretch, a third stretch extending obliquely upwardly, and a fourth stretch disposed in alignment with said first stretch and on the opposite side of the handle-side therefrom, the overall length of said retainer being not greater than the length of said horizontal slot and the width of said vertical slot being substantially equal to the diameter of the wire, said second and third stretches joining each other at a point substantially in alignment with the handle-side and forming a nose which, when the handle is lowered into the basket with the nose moving along a vertical slot position, will enter the horizontal slot portion and guide the remainder of the retainer therethrough into a position between the two thicknesses of a side wall of the basket, said handle being thereafter upwardly movable to bring said first and fourth stretches of the retainer into engagement with the bend uniting the two wall-thicknesses.

References Cited in the file of this patent

UNITED STATES PATENTS

| | | |
|---|---|---|
| 2,039,971 | Meinhardt | May 5, 1936 |
| 2,132,638 | Mohler | Oct. 11, 1938 |
| 2,636,663 | Hauck | Apr. 28, 1953 |